US012507012B2

(12) United States Patent
Chan et al.

(10) Patent No.: US 12,507,012 B2
(45) Date of Patent: Dec. 23, 2025

(54) DIAPHRAGM WITH DEFORMATION STRUCTURES TO REDUCE VIBRATION MAGNITUDE AT RESONANCE FREQUENCY

(71) Applicant: Glass Acoustic Innovations Co., Ltd., New Taipei (TW)

(72) Inventors: Kwun-Kit Chan, New Taipei (TW); Chien-Hsing Chu, New Taipei (TW); Chun-Hsuan Hsu, New Taipei (TW)

(73) Assignee: Glass Acoustic Innovations Co., Ltd., New Taipei (TW)

(*) Notice: Subject to any disclaimer, the term of this patent is extended or adjusted under 35 U.S.C. 154(b) by 0 days.

(21) Appl. No.: 18/481,188

(22) Filed: Oct. 4, 2023

(65) Prior Publication Data

US 2025/0317689 A1 Oct. 9, 2025

(30) Foreign Application Priority Data

Nov. 10, 2022 (TW) .................................. 111143032

(51) Int. Cl.

| | |
|---|---|
| ***H04R 7/14*** | (2006.01) |
| ***H04R 1/28*** | (2006.01) |
| ***H04R 7/04*** | (2006.01) |
| ***H04R 7/12*** | (2006.01) |
| ***H04R 31/00*** | (2006.01) |

(52) U.S. Cl.
CPC ............. *H04R 7/14* (2013.01); *H04R 1/2873* (2013.01); *H04R 7/04* (2013.01); *H04R 7/127* (2013.01); *H04R 31/003* (2013.01); *H04R 2231/001* (2013.01); *H04R 2307/023* (2013.01)

(58) Field of Classification Search
CPC .......... H04R 7/14; H04R 1/2873; H04R 7/04; H04R 7/127; H04R 31/003; H04R 2231/001; H04R 2307/023
See application file for complete search history.

(56) References Cited

FOREIGN PATENT DOCUMENTS

CN 114531634 A * 5/2022 ............... H04R 9/06

* cited by examiner

*Primary Examiner* — Tuan D Nguyen
(74) *Attorney, Agent, or Firm* — Chih Feng Yeh; Yongjean Consulting Inc.

(57) ABSTRACT

A speaker diaphragm structure is provided to reduce vibration magnitude at resonance frequency, which includes a hard material diaphragm, a plurality of small area three-dimensional deformation structures formed on the flat area of the hard material diaphragm. The small area three-dimensional deformation structures are used to suppress the vibration of a large area in the diaphragm into a local vibration of a small area, so as to reduce effects of the magnitude and lasting time of the resonance.

20 Claims, 6 Drawing Sheets

DIAPHRAGM WITH DEFORMATION STRUCTURES TO REDUCE VIBRATION MAGNITUDE AT RESONANCE FREQUENCY

CROSS-REFERENCE STATEMENT

The present application is based on, and claims priority from, TAIWAN Patent Application Serial Number 111143032, filed Nov. 10, 2022, the disclosure of which is hereby incorporated by reference herein in its entirety.

TECHNICAL FIELD

The present invention relates to a speaker diaphragm, more specifically, a speaker diaphragm with protruding deformation structures to reduce vibration magnitude.

BACKGROUND

A loudspeaker, commonly referred to as a speaker or speaker driver, is an electroacoustic transducer that converts an electrical audio signal into a corresponding sound. It mainly includes magnets, coils and the diaphragm. The speaker driver can be viewed as a linear motor attached to a diaphragm which couples the motor's movement. The diaphragm is vibrated by the driving force generated from the interaction between the coils and the magnets, thereby generating the sound.

The sound quality of the speaker significantly depends on the vibration mode of the diaphragm. An excellent speaker may completely convert the electrical signal into sound from the low frequency to the high frequency. It is generally required that the loudspeaker can generate a regular vibration pattern when making the sound.

Since the sound is generated by the vibration of the diaphragm, the quality of the sound is significantly related to the structure and the material of the speaker diaphragm.

When making the vibrating diaphragm, high quality material is required, the indexes of the better material include, for example, Young's modulus, density, damping coefficient, inner loss, and the material strength. Specifically, the harder the material, the wider the frequency band; the greater the inner loss, the smoother the frequency response.

Since the natural resonance frequency of the diaphragm is proportional to $(E/\rho)^{1/2}$, where E is the Young's modulus of the diaphragm and $\rho$ is the density of the diaphragm, this means that the diaphragm is not vibrated in phase over the entire surface area. Therefore, formant is created and it is observed in the frequency response curve, thereby distorting the sound.

For high-performance loudspeaker, the requirements of the diaphragm are small density, light weight, high strength, good toughness, and uniform structure. In order to allow the diaphragm to vibrate effectively with sounds of different frequencies, it is better to employ the material with high rigidity, low density and appropriate damping properties.

The diaphragm with signal material has uniform density, taking the frusto-conical diaphragm as an example, the specific configuration and material of the diaphragm may create sound at the appropriate frequency. The movement of the diaphragm is constriction in the direction of the cone, and the circular warping is formed from the center of the diaphragm, thereby causing acoustic pressure sudden drop. This occurs especially in the mid-high frequency range.

Similarly, a single-material planar diaphragm also generates a formant due to similar reasons, resulting in sound distortion.

In order to solve the above deficiencies, what is required is a solution to adjust the high-frequency damping by changing of the diaphragm structure to suppress the resonance.

SUMMARY

Based on above, the purpose of the present invention is to provide a speaker diaphragm for reducing vibration magnitude at resonance frequency. In one aspect, the speaker diaphragm includes a glass diaphragm; protruding deformation structures formed on the glass diaphragm. The three-dimensional or protruding deformation structures are used to suppress large area vibration into local vibration to reduce the amplitude of the wave at the resonance frequency. The area ratio of the protruding deformation structures to the original surface area without the protruding deformation structures is equal to or less than 1:5.

Preferably, the Young's modulus of the glass diaphragm ranges from 70 GPa to 1300 GPa. The average distribution area of all the protruding deformation structures is more than 40% of the diaphragm area. The protruding height of each the protruding deformation structure is ½ or more of a diaphragm thickness. The thickness of the glass diaphragm is 0.001 mm-0.7 mm.

In one aspect, the glass diaphragm is made with conical shape, planar shape, dome shape, or a disk shape having a W or M-shaped section.

In one aspect, during the forming processes, the glass diaphragm is heated to 600-800° C. to soften the glass material. The molding pressure for forming the protruding deformation structures is about 25 $N/m^2$~100 $N/m^2$. The protruding deformation structures are formed by the pulling forces when an upper mode and a lower mold are separated.

In another aspect of the present invention, the speaker diaphragm comprises a glass diaphragm, protruding deformation structures formed on the glass diaphragm, wherein the average distribution area of all the three-dimensional deformation structures is more than 40% of a diaphragm area, the protruding height of each the three-dimensional deformation structure is ½ or more of a diaphragm thickness; wherein the protruding deformation structures are used to suppress large area vibration into local vibration. The Young's modulus of the glass diaphragm ranges from 70 GPa to 1300 GPa.

BRIEF DESCRIPTION OF THE DRAWINGS

FIG. 2(*b*) shows a cross-section view of the conical diaphragm with protruding deformation structures according to an embodiment of the present invention.

FIG. 3(*b*)-3(*c*) shows a schematic diagram of forming the protruding structure of the diaphragm according to one embodiment of the present invention.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

Figure 1:
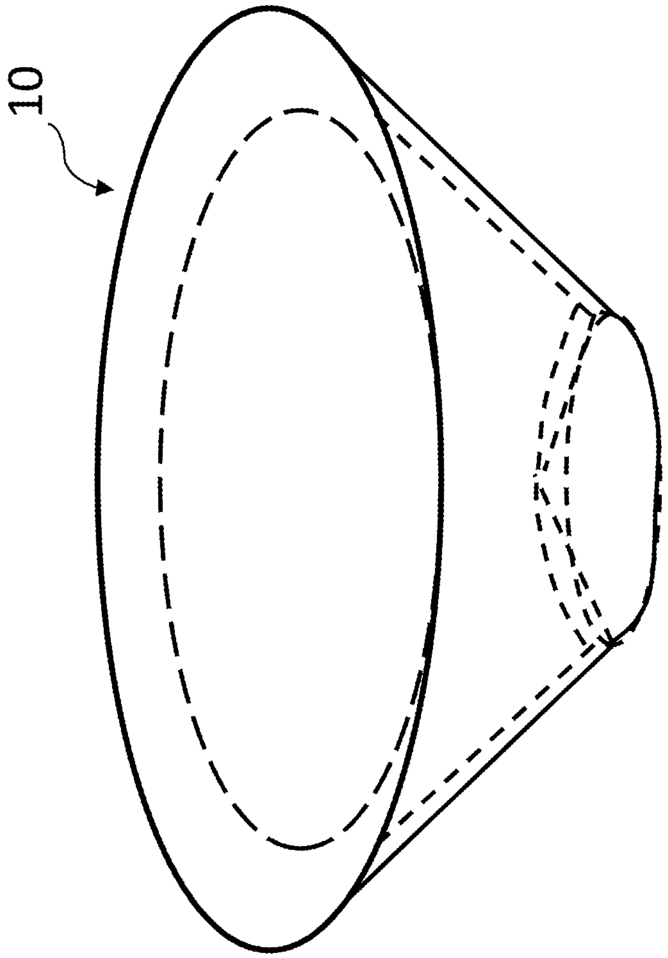
Fig. 1 (prior art)
FIG. 1 shows a perspective view showing a traditional material conical diaphragm.

FIG. 1 shows a traditional single-material conical diaphragm 10. Since the diaphragm is formed with the single material, the produced sound is often at the frequency defined by the configuration and material of the diaphragm. As aforementioned, the formant is created by the traditional design, causing sound distortion.

In order to effectively solve the problem of formant at the resonance frequency and the sound distortion, the present invention forms the three-dimensional (protruding) structures in the original flat area of the diaphragm to suppress the large area vibration into small area local vibration, for reducing the amplitude of the wave and the vibration time at the resonance frequency.

The method of the present invention includes step of raising the manufacture temperature to the molding temperature of the diaphragm, and pressing the plane material of the diaphragm into the required protruding (three-dimensional) shape in a molding apparatus with the upper and lower molds.

According to an embodiment of the present invention, the hard material diaphragm is made with shape of conical, planar, dome-shaped, or disk-shaped with a W or M-shaped section.

The glass diaphragm has high electro-acoustic conversion efficiency (because of its high mechanical strength, low density, and fast sound propagation speed), wide frequency range (because of its strong rigidity to reduce split vibration and deformation at low frequencies), excellent characteristics such as good sound quality/timbre, and good processability. Therefore, the sound generating device of the present invention has extremely high value and application potential. The example of glass diaphragm is illustrated as follows.

Figure 2A:
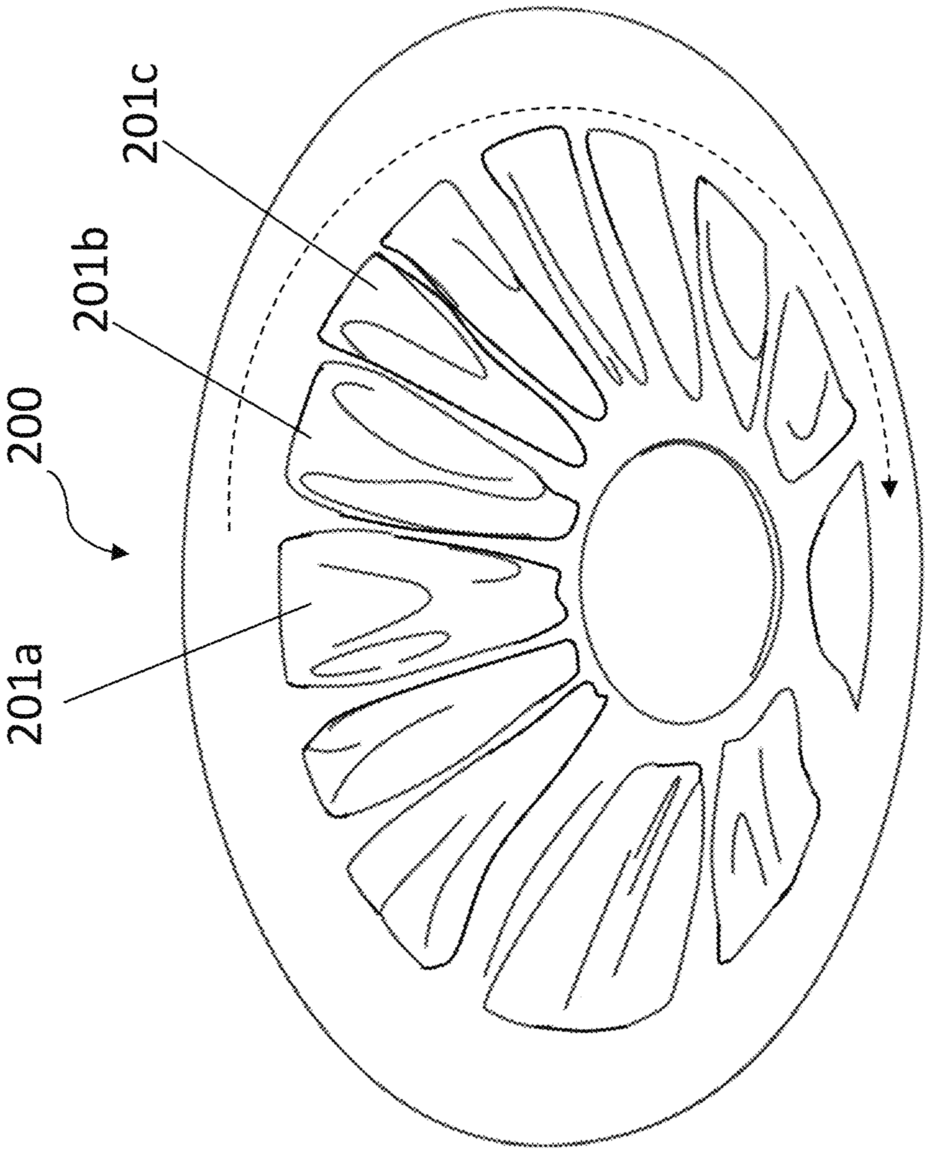
FIG. 2(*a*) shows a perspective view of a conical diaphragm with protruding deformation structures according to an embodiment of the present invention.
Figure 2B:
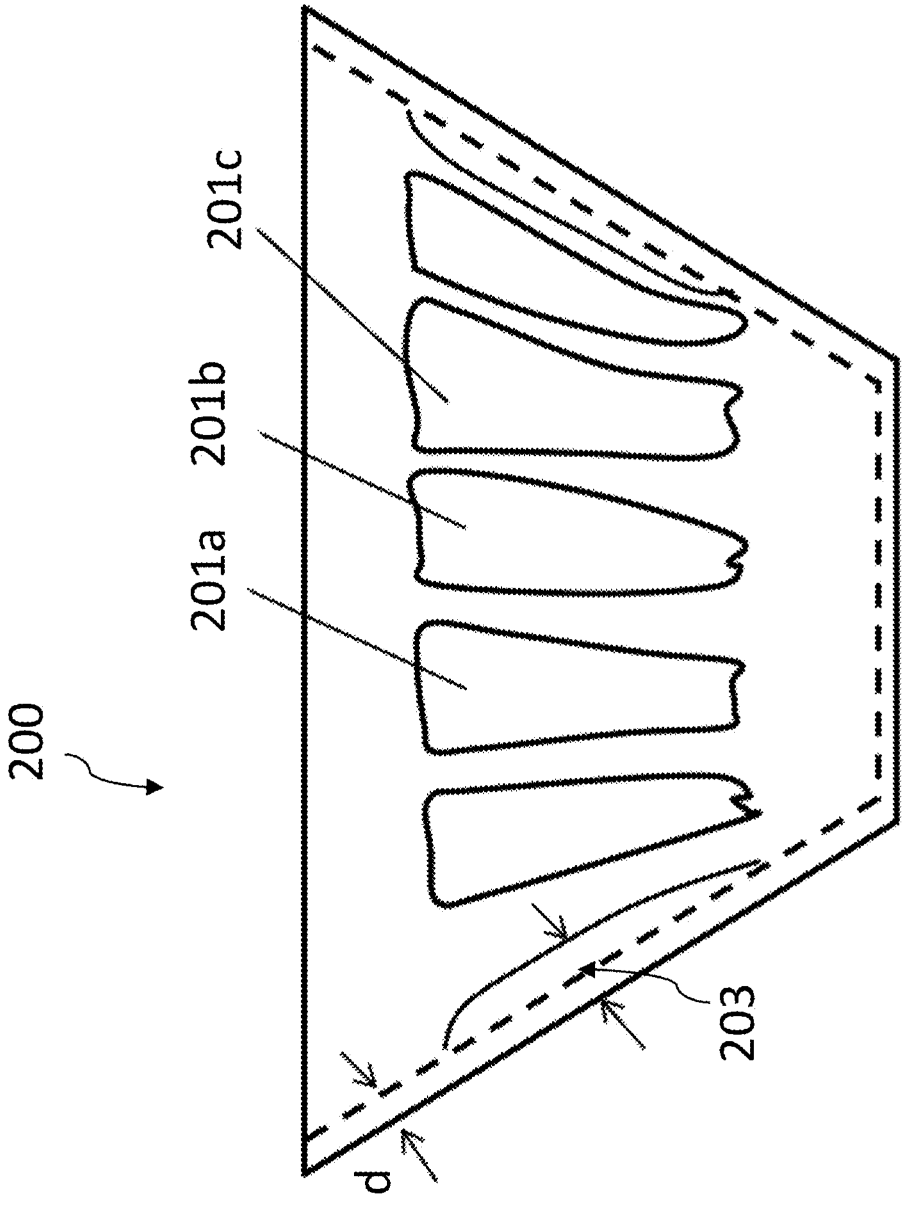

According to an embodiment of the present invention, a conical diaphragm 200 is provided, protruding (three-dimensional) structures are formed on the original flat area of the hard material diaphragm, as shown in FIG. 2(*a*). On the inner surface of the conical diaphragm, a plurality of small-area protruding (three-dimensional) deformation structures 201*a*, 201*b*, 201*c* . . . , such as corrugated or wrinkled structures (ripple structure), are formed along the azimuth direction (the direction of the dotted arrow). The protruding deformation structure act as damping to the transmitted sound wave. The protruding deformation structures suppress the large area vibration of the sound waves transmitted in the diaphragm into a local vibration of a small area, thus reducing the amplitude of the wave and the vibration time at the resonance frequency.

FIG. 2(*b*) is a schematic cross-sectional view of the conical diaphragm 200 with small-area protruding (three-dimensional) structures of the present invention.

In one embodiment of the present invention, the pluralities of small-area protruding (three-dimensional) deformation structures 201*a*, 201*b*, 201*c* are formed in the flat area of the diaphragm. The area ratio of protruding deformation structure to the original area is equal to or less than 1:5.

In one embodiment of the present invention, the average distribution area of all the protruding (three-dimensional) deformation structures is more than 40% of the diaphragm area.

Preferably, referring to FIG. 2(*b*), the protruding height 203 of each protruding (three-dimensional) deformation structures is ½ or more of the diaphragm thickness d.

According to an embodiment of the present invention, the Young's modulus of the diaphragm material ranges from 70 GPa to 1300 GPa.

Figure 3A:
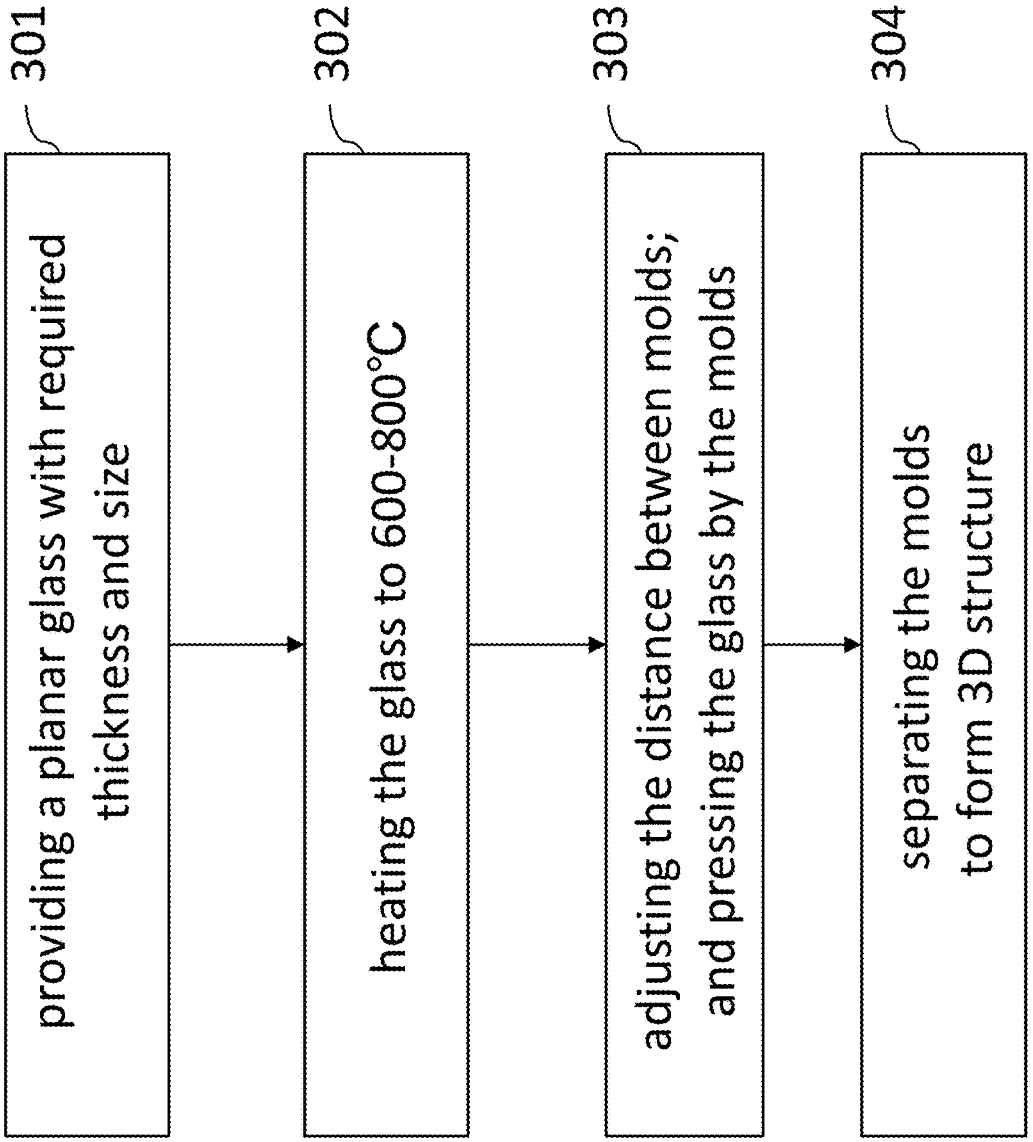
FIG. 3(*a*) shows a flow of forming the conical diaphragm with protruding deformation structures of the present invention.
Figure 3B:
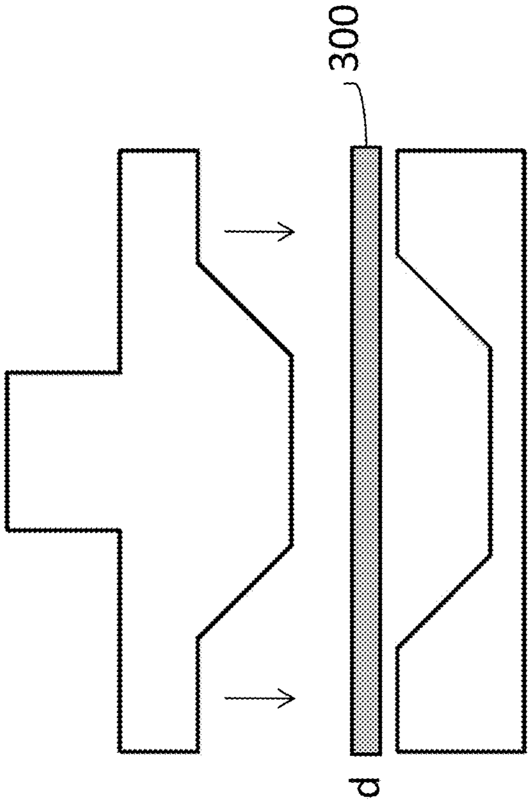
Figure 3C:
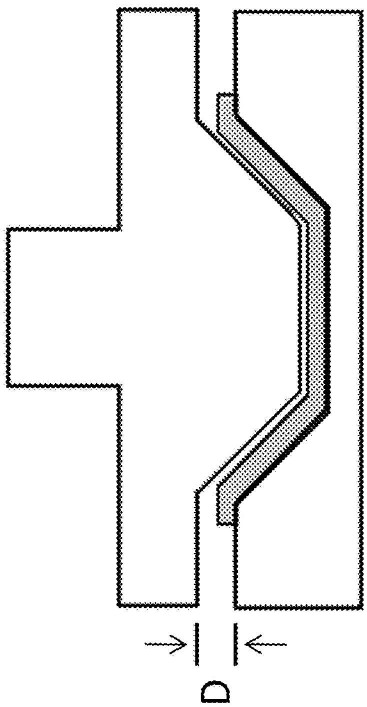

FIG. 3(*a*) is a manufacturing method of the present invention to form a three-dimensional structure in the flat area of the hard material diaphragm. The glass diaphragm is taken as an example, but it is not limited thereto, and other hard materials may also be used.

The above manufacturing method includes step 301, at first, providing a planar hard material having a thickness of d and required shape and size, for example, a glass diaphragm, with a thickness of about 0.001 mm-0.7 mm. Subsequently, in step 302, the glass diaphragm is heated to 600-800° C. to soften the material; then in step 303, the distance D between the upper and lower molds is adjusted so that the distance D is equal or greater than the thickness of the flat hard material, followed by pressing the glass by the molding machine, wherein the molding pressure range is about 25 $N/m^2$~100 $N/m^2$ and the distance D is equal or greater than the thickness d. Finally, in step 304, the upper and lower molds are separated, the softened glass diaphragm has pluralities of small-area protruding structures, namely, the corrugated or wrinkled structures formed in the flat area of the glass diaphragm.

The main reason of forming the corrugated or wrinkled structure of the glass diaphragm is illustrated in FIG. 3(*b*)-3(*c*). The conical diaphragm is employed as an example for description purpose only. Preferably, the protruding deformation structures are formed on the inner surface of the conical diaphragm.

The thickness of the softened glass diaphragm 300 is basically not change. When the upper and lower molds are pressed, the distance D between the upper and lower molds can be adjusted to be equal or larger than the thickness d of the glass diaphragm. Since the glass diaphragm before deformation is complete planar material, its area must be larger than the area of the conical shape after pressing the planar material. During the separation process of the upper and lower molds, the wrinkle structures are formed on the softened glass diaphragm by the upper and lower pulling force, and the wrinkle structures are distributed in the azimuth direction of the conical diaphragm.

Figure 4:
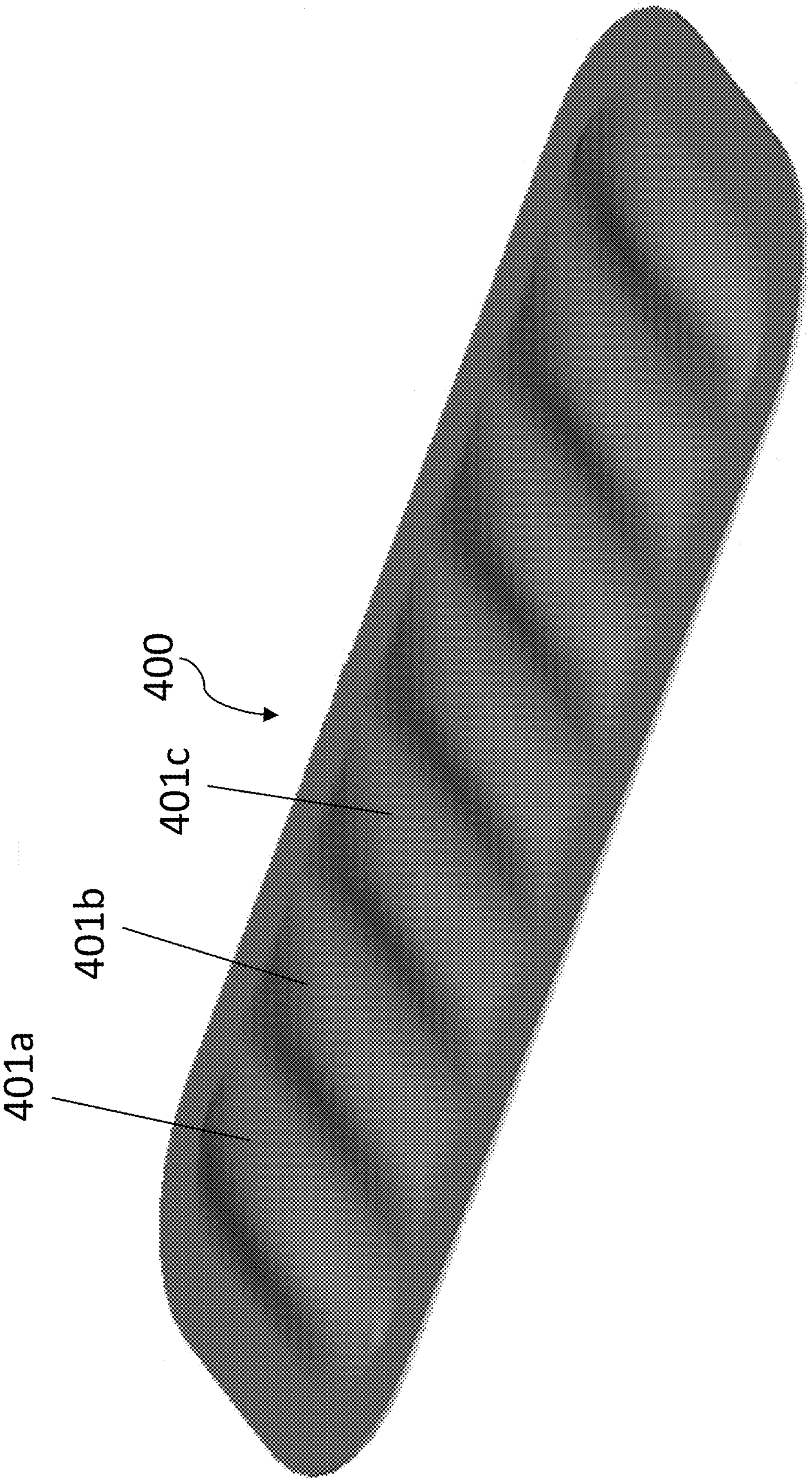
FIG. 4 shows a view of a planar diaphragm with protruding structures according to an embodiment of the present invention.

FIG. 4 shows a planar diaphragm 400 with a small-area protruding structure formed on a flat region of a hard material diaphragm according to another embodiment of the present invention.

In the drawings, pluralities of small-area three-dimensional deformation structures 401*a*, 401*b*, 401*c*, such as corrugated or wrinkled structures (ripple structure), are formed along its long axis direction of the flat area of the planar diaphragm 400. The diaphragm deformation structure can suppress the vibration of a large area into a local vibration of a small area. Therefore, the amplitude of resonance wave is reduced and the vibration time is shortened at the resonance frequency.

According to an embodiment of the present invention, the small-area three-dimensional deformation structures 401*a*, 401*b*, 401*c* are formed on the original diaphragm flat area. The area ratio of three-dimensional deformation structure to the original flat area is equal to or less than 1:5.

In one embodiment of the present invention, the average distribution area of all the three-dimensional deformation structures is more than 40% of the diaphragm area.

Preferably, referring to FIG. 2(*b*), the protruding height 203 of each three-dimensional deformation structures is ½ or more of the diaphragm thickness d.

The method of forming pluralities of small-area three-dimensional deformation structures 401*a*, 401*b*, 401*c* . . . in the flat area of the planar diaphragm 400 is basically the same as the process described in FIG. 3(*a*), except the shape, spacing and pressing pressure of the upper and lower mold.

Similarly, the main reason for forming the corrugated or wrinkled structure in the flat area of the glass diaphragm is similar to the mechanism described in the preceding paragraphs.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. A speaker diaphragm comprising:

a glass diaphragm;

protruding deformation structures formed on inner surface of said glass diaphragm;

wherein said protruding deformation structures are used to reduce a wave amplitude at resonance frequency; wherein an average distribution area of all said protruding deformation structures is more than 40% of a diaphragm area.

2. The speaker diaphragm of claim 1, wherein a Young's modulus of said glass diaphragm ranges from 70 GPa to 1300 GPa.

3. The speaker diaphragm of claim 1, wherein said protruding deformation structures includes corrugated or wrinkled structures.

4. The speaker diaphragm of claim 1, wherein a protruding height of each said protruding deformation structures is ½ or more of a diaphragm thickness.

5. The speaker diaphragm of claim 1, wherein said glass diaphragm is made with conical shape.

6. The speaker diaphragm of claim 1, wherein said glass diaphragm is made with planar shape.

7. The speaker diaphragm of claim 1, wherein said glass diaphragm is made with dome shape.

8. The speaker diaphragm of claim 1, wherein said glass diaphragm is made with a disk shape having a W or M-shaped section.

9. The speaker diaphragm of claim 1, wherein a thickness of said glass diaphragm is 0.001 mm-0.7 mm.

10. The speaker diaphragm of claim 1, wherein said glass diaphragm is heated to 600-800° C. to soften said glass diaphragm.

11. The speaker diaphragm of claim 1, wherein a molding pressure for forming said protruding deformation structures is about 25 $N/m^2$~100 $N/m^2$.

12. The speaker diaphragm of claim 11, wherein said protruding deformation structures are formed by pulling forces when an upper mode and a lower mold are separated.

13. A speaker diaphragm, comprising:

a glass diaphragm, protruding deformation structures formed on a surface of said glass diaphragm, wherein an average distribution area of all said protruding deformation structures is more than 40% of a diaphragm area, a protruding height of each said protruding deformation structures is ½ or more of a diaphragm thickness; wherein said protruding deformation structures are used to reduce a wave amplitude at resonance frequency.

14. The speaker diaphragm of claim 13, wherein a Young's modulus of said glass diaphragm ranges from 70 GPa to 1300 GPa.

15. The speaker diaphragm of claim 13, wherein said glass diaphragm is made with conical shape.

16. The speaker diaphragm of claim 13, wherein said glass diaphragm is made with planar shape.

17. The speaker diaphragm of claim 13, wherein said glass diaphragm is made with dome shape.

18. The speaker diaphragm of claim 13, wherein said glass diaphragm is made with a disk shape having a W or M-shaped section.

19. The speaker diaphragm of claim 13, wherein a thickness of said glass diaphragm is 0.001 mm-0.7 mm.

20. The speaker diaphragm of claim 13, wherein said protruding deformation structures includes corrugated or wrinkled structures.

* * * * *